US005508818A

United States Patent [19]

Hamma

[11] Patent Number: 5,508,818

[45] Date of Patent: Apr. 16, 1996

[54] MIXED MAIL TRANSPORT

[75] Inventor: John C. Hamma, Milford, Conn.

[73] Assignee: Scan-Code, Inc., East Hartford, Conn.

[21] Appl. No.: 311,120

[22] Filed: Sep. 23, 1994

[51] Int. Cl.$^6$ .......... H04N 1/00; H04N 1/04

[52] U.S. Cl. .......... 358/403; 358/498; 358/401; 271/3.03; 271/3.05; 271/3.14; 271/4.01; 271/122; 271/198; 271/266

[58] Field of Search .......... 358/403, 498, 358/496, 471, 474, 400, 401; 271/3.03–3.06, 3.14, 4.01, 122, 241, 248, 202, 266, 270; 414/788.8

[56] References Cited

U.S. PATENT DOCUMENTS

| | | | |
|---|---|---|---|
| 4,478,400 | 10/1984 | Commers | 271/3.03 |
| 4,739,369 | 4/1988 | Yoshiura et al. | 271/3.03 |
| 4,771,896 | 9/1988 | Newsome | 271/3.03 |
| 4,861,014 | 8/1989 | Martine | 271/198 |
| 5,083,769 | 1/1992 | Young, Jr. | 271/198 |
| 5,096,177 | 3/1992 | Saeki et al. | 271/3.05 |
| 5,097,959 | 3/1992 | Tilles et al. | 271/4.01 |
| 5,100,125 | 3/1992 | Uplinger et al. | 271/198 |
| 5,119,954 | 6/1991 | Svyatsky et al. | 271/3.05 |
| 5,190,281 | 3/1993 | Cardenas | 271/198 |
| 5,222,860 | 6/1993 | Kamath et al. | 271/4.01 |
| 5,226,641 | 7/1993 | Schieleit | 271/198 |
| 5,280,902 | 1/1994 | Helmstädter | 271/198 |
| 5,336,876 | 8/1994 | Taylor | 271/3.05 |
| 5,346,072 | 9/1994 | Dian et al. | 271/3.14 |
| 5,363,971 | 11/1994 | Weeks et al. | 271/3.06 |
| 5,415,385 | 5/1995 | Newsome et al. | 271/202 |

*Primary Examiner*—Scott A. Rogers
*Assistant Examiner*—Fan Lee
*Attorney, Agent, or Firm*—Chilton, Alix & Van Kirk

[57] ABSTRACT

A system for transporting mixed documents having a loading conveyor for transporting documents to a document prefeeder. The document prefeeder transports documents from the loading conveyor on an angled conveyor to a stack feeder that accumulates a shallow stack of documents. A single document feed removes single documents from a shallow stack on the stack feeder and transports the single documents to a main conveyor. A camera on the main conveyor reads each document such as mail, and prints information concerning the document, such as a bar code, on each document. The documents are moved by the main conveyor to an output conveyor for sorting and accumulation.

19 Claims, 6 Drawing Sheets

MIXED MAIL TRANSPORT

BACKGROUND OF THE INVENTION

The present invention relates to the processing of documents and particularly to the serial delivery of envelopes of mixed size and thickness from an unsorted stack to a character reader. More specifically, this invention is directed to a transport system having the capability of accepting, and feeding singly to a character reader, pieces of mail of different sizes received in the form of an unsorted stack. Accordingly, the general objects of the present invention are to provide novel and improved methods and apparatus of such character.

DESCRIPTION OF THE PRIOR ART

While not limited thereto in its utility, the present invention is particularly well suited for use in cooperation with a system wherein postal ZIP code information is automatically printed on envelopes which are serially fed past an optical character reader and a printer. In such a system, the optical character reader will "read" the alphanumeric information comprising the address, look up the corresponding postal code, and send appropriate instructions to the printer to cause the printing of a bar code on the envelope which is commensurate with the address which has been read. Such automatic bar code printing apparatus is in demand because of significant savings in postal costs offered to mailers that deliver bar coded mail to the postal service for sorting and subsequent delivery.

In the past the serial delivery of mail pieces to the paper transport of a character reader/bar code printer system has been highly labor intensive. The foregoing has resulted from the fact that the mail to be processed had to be hand sorted prior to placement on the transport system. Such hand sorting was necessary because the prior systems were incapable of processing mixed mail, i.e., mail pieces of different size. The pieces had to be preliminarily hand sorted by size before introduction to the character reader/bar code system. Additionally, even when the mail to be processed was all of the same size, prior art transports have operated on the principal of bottom-feeding from a shallow stack. As the operational speed at which character reader/printer systems function has increased, human operators have been required to substantially continuously form and load small stacks of mail into shallow stack feeders.

SUMMARY OF THE INVENTION

The present invention overcomes the above briefly discussed deficiencies and other disadvantages of the prior art by means of a novel technique for processing unsorted documents of differing size wherein a continuously replenished shallow "stack" of the documents is created and properly positioned relative to a transport path. This novel technique also encompasses the reliable extraction, from the shallow stack of single documents and the realignment, as necessary, of the extracted documents with the transport path of the character reader. This apparatus and method is ideally suited for mail pieces, but can be used for all types of documents. Applicable types of documents include book covers returned to publishers that have been removed from paperback books for refunds. Apparatus in accordance with the invention, for implementing this novel method, includes a loading conveyor which delivers unsorted, i.e., mixed size, mail pieces or other document pieces to a pre-feed module. The pre-feed module extracts the pieces from the loading conveyor in the form of a stream of overlapped envelopes and deposits the thus extracted pieces on a feed stack module. The feed stack module accumulates the envelopes as a shallow stack, edge registers the envelopes and continuously advances the shallow stack of mail. A singulation mechanism is located at the downstream end of the feed stack module for the purpose of removing single pieces from the shallow stack. The removed pieces are then repositioned, as necessary, by means of a registration module so as to be in registration with the transport path at a main conveyor which will convey the single pieces serially past a character reader and printer.

Apparatus in accordance with the invention also includes, downstream of the printer, an output module. This output module in the case of a mail processing system, will receive bar coded pieces from the printer. The thus received pieces will then be accumulated, in one or more rows, typically in at least a partially upraised orientation.

BRIEF DESCRIPTION OF THE DRAWINGS

The present invention may be better understood, and its numerous objects and advantages will become apparent to those skilled in the art, by reference to the accompanying drawings wherein like reference numerals to like elements in the several figures in which.

DESCRIPTION OF THE DISCLOSED EMBODIMENT

Figure 1:
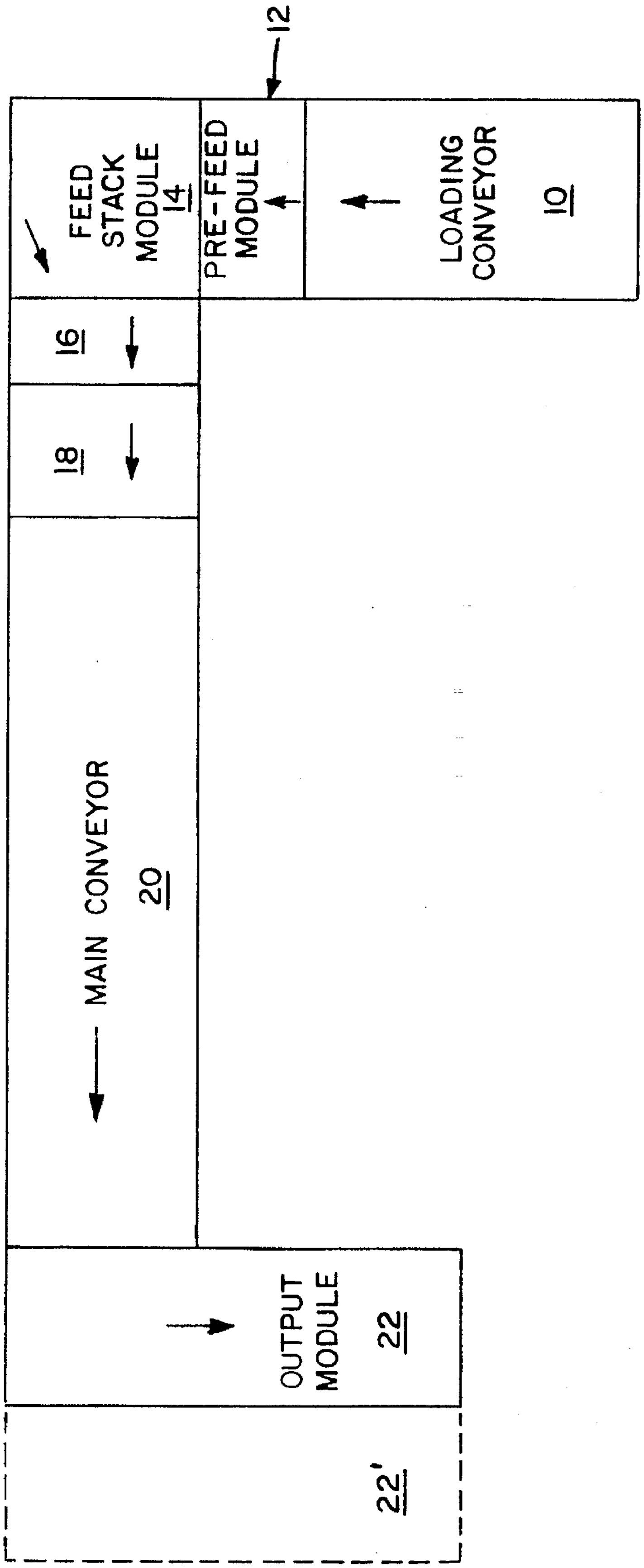
FIG. 1 is a schematic, top-elevation view of a transport system in accordance with the present invention.

With reference to the drawings, the disclosed embodiment of a transport system for mixed mail pieces consists of a loading conveyor 10 and a pre-feed module 12. In the manner to be described below, conveyor 10 and pre-feed module 12 cooperate to deliver a stream of mail pieces to be processed to a feed stack module 14. Also in the manner to be described below, the feed stack module 14 forms the pieces delivered thereto into a shallow "stack" of mail. The thus formed shallow stack is, in turn, delivered to a singulation module 16. In the singulation module 16, individual pieces are extracted from the bottom of the shallow stack and passed to a registration module 18. The purpose of registration module 18 is to ensure that the single pieces are aligned with a transport path, defined by the downstream main conveyor 20, which will cause the pieces to serially pass the image capture module of a character reader and a printer both of which will be briefly discussed below in the description of FIG. 5. Pieces arriving at the downstream end of main conveyor 20 are placed on the conveyor of an output module 22. As indicated by the broken line showing on FIG. 1, the output modules may be stacked. Such stacking will be further described in the discussion below of FIG. 6.

Figure 2:
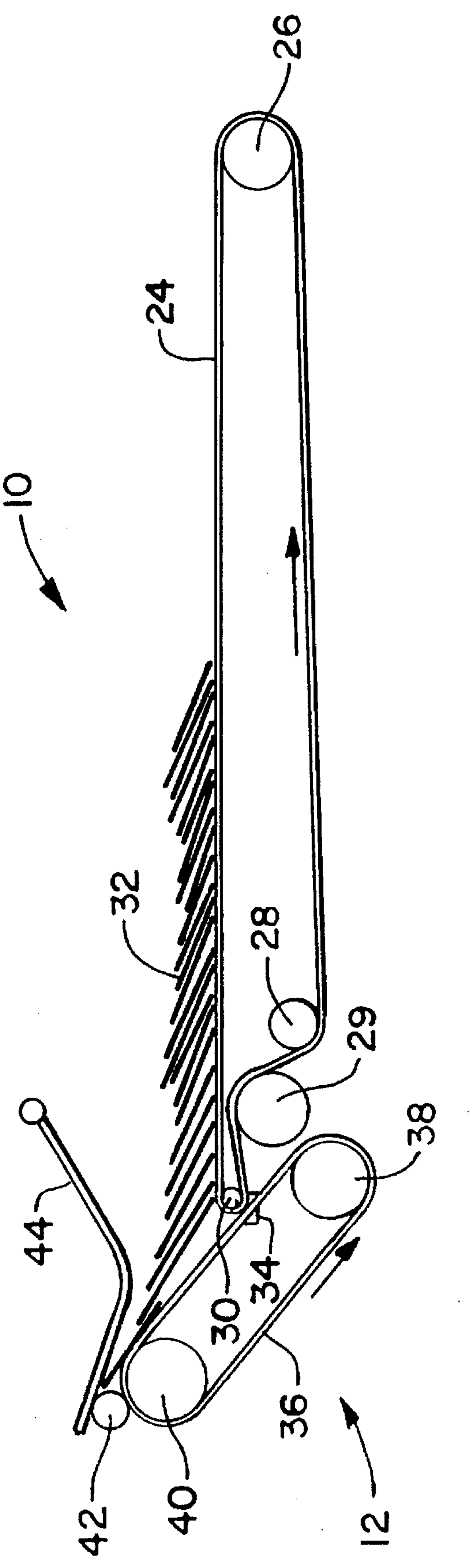
FIG. 2 is a schematic, side-elevation view, of the loading conveyor and pre-feed module portions of the transport of FIG. 1.

The loading conveyor 10 and pre-feed module 12 are shown in more detail, albeit schematically, in FIG. 2. Loading conveyor 10 comprises an intermittently driven conveyor belt 24 which passes about rollers 26, 28, 29 and 30. At least roller 26 will be positively driven. The drive for belt 24 has not been shown but will obviously comprise an electric motor and means coupling the motor output shaft to the drive roller(s). Belt 24 functions essentially as a horizontal conveyor which receives unsorted mail from an operator and provides a large storage capacity for the mail to be processed. A quantity of such unsorted, i.e., mixed size, mail has been indicated at 32. A particularly novel and useful feature of the present invention resides in the fact that the large storage capacity of loading conveyor 10 allows an operator to load a very large amount of mail and then leave the loading area unattended for significant periods of time. During these time periods the operator can perform other duties such as, for example, unloading the output module 22.

As indicated in FIG. 2, mail is loaded into the transport system of the present invention simply by stacking it on top of conveyor belt 24. In the disclosed embodiment, where the number of sensors is minimized, the operator will ensure that the pieces loaded on belt 24 will at least partly overlap, i.e., there will be no gaps in the supply being moved forwardly, i.e., to the left as the apparatus is shown in FIG. 2, on belt 24. The drive motor for loading conveyor 10 is controlled by means of a sensor 34 which, typically, will be a photoelectric device. An output from sensor 34 will cause belt 24 to be driven whenever a space is detected, i.e., whenever the gap between the mail bridging the downstream end of conveyor 10, and the pre-feed module 12, is greater than a preset amount.

The pre-feed module 12 consists of a second conveyor having a belt 36 which is upwardly inclined. The function of belt 36, which passes around a pair of rollers 38 and 40, is to "shingle" the incoming mail upward from loading conveyor 10. Thus, mail being delivered to pre-feed module 12 is frictionally engaged by belt 36 and moved upwardly, typically at an angle of approximately 45°. The upwardly moving mail will pass between a continuously rotating small roller 42 and a pivotally mounted safety shield 44.

Figure 3A:
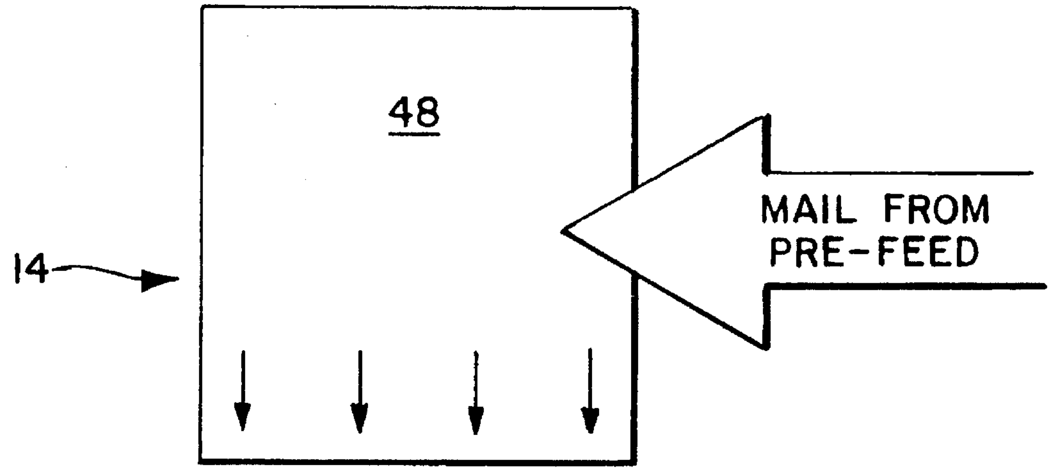
FIGS. 3A and 3B are respectively top and side elevation views of the feed stack module of the transport of FIG. 1, the view of FIG. 3B being taken transverse to the direction of the view of FIG. 2.

The belt 36 of pre-feed module 12 is also intermittently driven under the control of a sensor 46 which is located in the downstream feed stack module 14. Sensor 46 as shown in FIG. 3A will energize a motor to drive belt 36 whenever a gap occurs in the shallow stack which is formed in module 14. As will be discussed below, the shallow stack formed in module 14 is caused to move in a direction transverse to the direction of movement of the pieces on belt 36. The drive for belt 36 is completely independent of the drive for belt 24 of loading conveyor 10. The purpose of roller 42 is to ensure that no mail piece will "teeter" on the end of the conveyor of pre-feed module 12 when the drive of belt 36 is interrupted. Any mail left in such a teetering state could turn over as it falls onto the conveyor of the feed stack module 14 and, of course, mail with the incorrect front-to-back orientation could not be read by the downstream character reader.

The hinged shield 44 cooperates with the continuously operating roller 42 to provide a pinch force between the roller and the mail piece to cause positive drive. Such positive drive further ensures against the possibility of an undesirable inverting of a piece of mail delivered to the feed stack module 14. The shield 44 also, by defining a feed funnel which narrows in the downstream direction, prevents short mail pieces from accidentally flipping over backwards as they ascend the angled belt 36. Finally, shield 44 guards against the possibility of loose clothing or long hair of an operator being caught in roller 42.

Figure 3B:
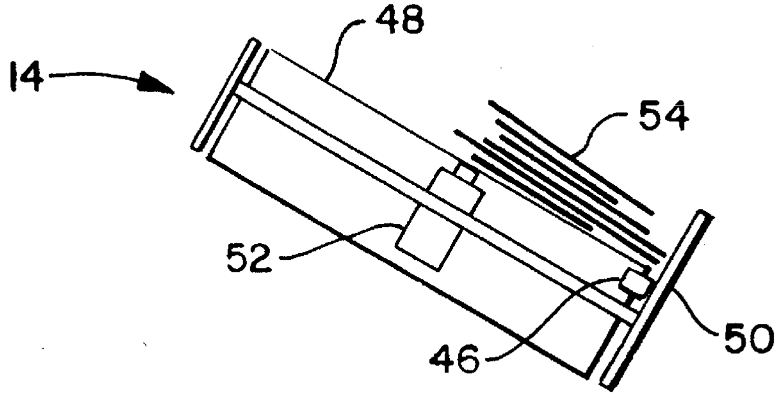

As indicated above, the discharge end of the pre-feed module 12 is located above the feed stack module 14. Referring to FIG. 3, the feed stack module comprises an angled conveyor belt 48 driven by means, not shown.

The sensor 46 is located under belt 48 and senses upward between a gap formed by the edge of the belt 48 and a rail guide 50. When documents fail to bridge the gap, the sensor 46 energizes a motor to drive the belt 36 of prefeed module 12. Belt 48 is characterized by a support surface which has a low coefficient of friction. Thus, mail deposited on belt 48 from pre-feed module 12 will slide downwardly, i.e., generally opposite to the supply direction, toward a stationary fence or guide rail 50 which defines a registration surface. In order to promote movement of the mail pieces in the direction of the registration surface, while belt 48 is advancing the mail in the transverse conveyor direction, belt 48 is vibrated from the underside by means of one or more mechanical agitators 52. In the embodiment shown, mechanical agitator 52 is a cam that intermittently contacts the bottom of belt 48 when the agitator is driven by a motor means (not shown). Thus, because belt 48 is tilted and has a low friction surface, the mail pieces will tend to slide down the conveyor and register against fence 50. This tendency is greatly increased by vibrating belt 48, i.e., by causing a periodic up-and-down motion of belt 48 by an agitator 52.

As should be apparent to those skilled in the art from the above description, the functions of feed stack module 14 are to accumulate, edge register, and continuously advance a shallow stack of mail. Such a shallow stack is indicated at 54 in FIG. 3B. In order to achieve reliable singulation, particularly in the case where the mail being processed is mixed in size and/or weight, it is highly desirable to feed from the bottom of an edge-registered stack and it is mandatory that such a stack be shallow. If the stack is too high, there will be too much force on the bottom pieces and the friction between such pieces will prevent reliable extraction of the single, lowermost piece. Also, in order for the system to operate at an acceptable through-put rate, the shallow stack must be continuously and reliably replenished through the combined operation of loading conveyor 10, pre-feed module 12 and feed stack module 14.

Figure 4A:
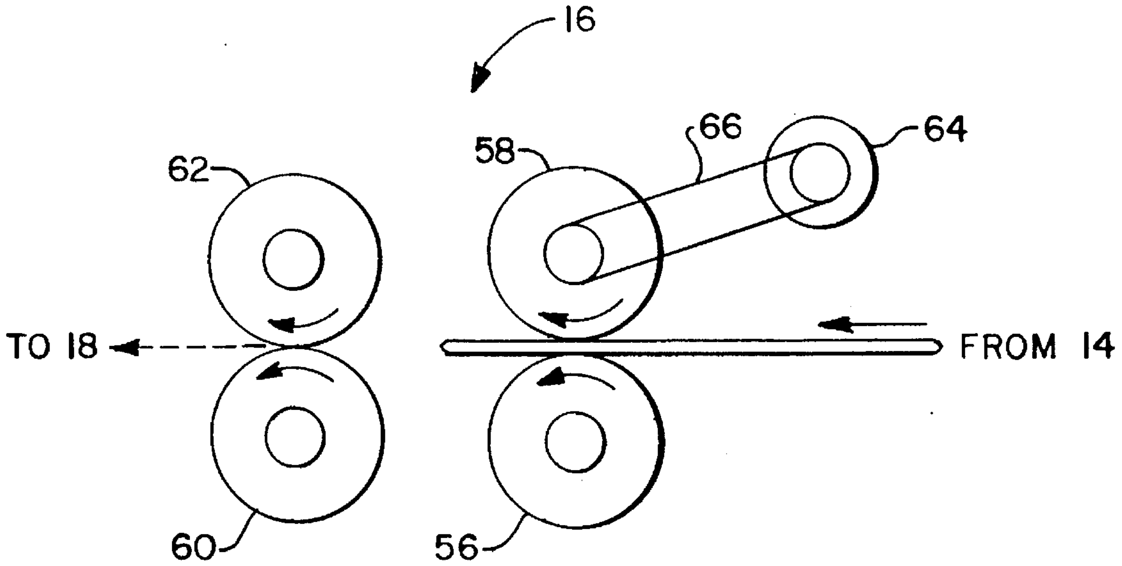
FIGS. 4A and 4B schematically illustrate the operation of the singulation module of the transport of FIG. 1.
Figure 4B:
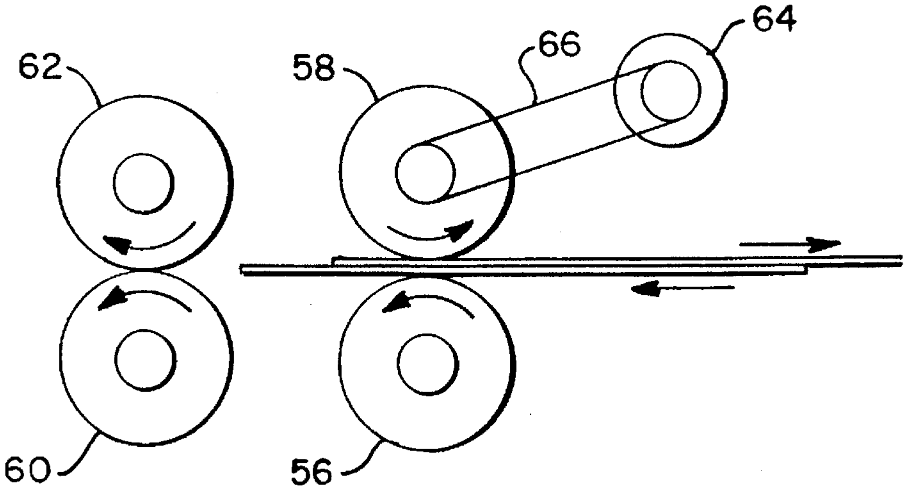

The shallow stack 54 formed in the feed stack module 14 is carried, on belt 48, to the singulation module 16. Referring to FIGS. 4A and 4B, which schematically represent the operation thereof, singulation module 16, with one important exception of a clutch type, is constructed and functions in accordance with the prior art. Thus, the singulation module 16 operates on what is known in the art as the "dynamic retardation" principle. Module 14 employs two pair of rollers. The first roller pair includes a positively driven feed roller 56 and a cooperating retard roller 58 which, as will be described below, is also driven. A pair of cooperating take-away rollers 60 and 62, at least the lower of which is positively driven, are located downstream of rollers 56 and 58. The means for driving roller 56 is not shown in the drawing but, in one reduction to practice, comprised the same power source as employed to drive belt 48 of the feed stack module 14. In the same reduction to practice, roller 60 of the take-away roller pair was also coupled to the same power source via an over-running clutch. This coupling may, for example, be accomplished by belts and pulleys with the power source being a common electric drive motor. The retard roller 58 is driven, in a direction opposite to the direction of rotation of roller 56, through a slip clutch which has been indicated at 64. The drive of roller 58 is accomplished by coupling its axle to the power source, not shown, via a drive belt 66 and clutch 64.

In operation, the torque applied to roller 58 is adjusted to be just weak enough to allow the bottom roller 56 to overcome the tendency of upper roller 58 to drive in reverse when the two rollers are directly coupled. Thus, if retard roller 58 is in contact with feed roller 56, or if the two rollers are coupled by a single piece of mail, roller 58 will function as an ordinary idler roll and will rotate in the forward or clockwise direction as the apparatus is shown. Under such circumstances, the single mail piece engaged by rollers 56 and 58 will be passed on to the take-away rollers 60, 62. This mode of operation is depicted in FIG. 4A. If more than one piece of mail passes into the nip of rollers 56 and 58, because of the relatively low friction between the pieces, retard roller 58 will drive the upper piece or pieces of mail backward as shown in FIG. 4B. Thus, the dynamic retardation principle relies upon the ability of the documents being processed to slip relative to each other to ensure that only single pieces will be engaged by the take-away rollers 60,62.

A particularly important feature of the present invention resides in the use of an eddy current slip clutch 64. Prior art sheet feeders which operated on the "dynamic retardation" principle have employed conventional slip clutches which rely upon mechanical friction. While such devices are adequate for light duty applications, for example use in typical office machinery, they would experience rapid wear with subsequent failure in demanding appliations such as mail processing systems.

The take-away rollers 60, 62 are constantly running. Feed roller 56 is, as noted above, driven through an over-running clutch. Accordingly, when the take away rollers engage a piece of mail, they are capable of pulling the engaged piece through the singulation nip even if the drive for feed roller 56 is turned off. Accordingly, the system has the capability of feeding one, and only one, piece on demand. Commands for engaging and disengaging the drive for feed roller 56 are generated by a computer operationally connected to a "camera" 76, shown in FIG. 5. When the camera needs a document to read, the computer commands roller 56 to send a document. This on demand feeding allows the "camera" to have sufficient time to read each document at a variable rate dependent on how long the actual reading take as compared to a set rate. A set rate of introducing documents in the reader could either be too fast, allowing insufficient time for camera "reading"; or too slow leading to inefficient. The camera operating through a computer can set an optimum rate dependent on the types of documents.

Returning to FIG. 4, the single mail pieces which pass between the take-away rollers 60, 62 are delivered to registration module 18. Registration module 18 is substantially a duplicate of feed stack module 14. That is, registration module 18 includes an inclined low-friction belt, which is caused to vibrate, and a guide rail which defines a registration surface. Registration module 18 ensures that any piece which may have become misaligned during the singulation process will be realigned with the desired transport path prior to entering the main conveyor 20.

Figure 5:
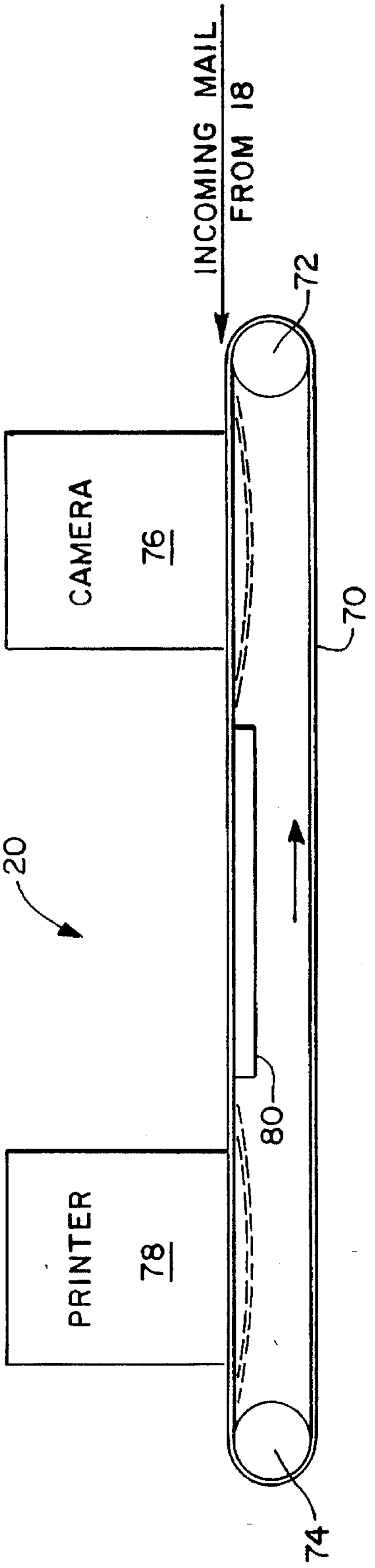
FIG. 5 is a schematic, side-elevation view of the main conveyor portion of the transport of FIG. 1, the character reader and printer of a mail processing system being associated with the main conveyor.

Referring to FIG. 5, the main conveyor 20 is essentially a horizontal conveyor consisting of a continuous belt 70 which passes about a pair of rollers 72, 74. A "camera" 76 is positioned over belt 70 adjacent the receiving end thereof, i.e., immediately downstream of the registration module 18. The "camera" 76 may, for example, comprise the imaging device of an optical character recognition (OCR) system which scans the incoming mail, "reads" the alphanumeric address information and "looks up" the postal code commensurate with the read address. A printer 78, which may for example be an ink jet printer, is located downstream of the "camera" 76 and also above belt 70. The spacing between "camera" 76 and printer 78 will be sufficient, taking into account the speed of movement of the singulated mail pieces, to allow the OCR system to produce the command signals for printer 78. Thus, when a scanned mail piece reaches printer 78, a bar code commensurate with the postal zip code determined by the OCR system will be printed on the piece. A computer control system can control the "camera", the printer, and the rate of documents on the main conveyor. Each can also be independently controlled.

Intermediate the "camera" 76 and printer 78, the belt 70 passes over and is supported by a belt support 80. However, in the regions immediately below the "camera" 76 and printer 78, the belt 70 is unsupported. This absence of support permits belt 70 to flex slightly to thereby accommodate mail pieces of various thickness. The resiliency of belt 70 will push the top of each mail piece, regardless of its thickness, upwardly into the focal plane of the "camera" 76, i.e., the area of the mail pieces to be imaged will be in focus regardless of thickness. Under normal operating conditions, the belt 70 will be constantly driven.

Figure 6A:
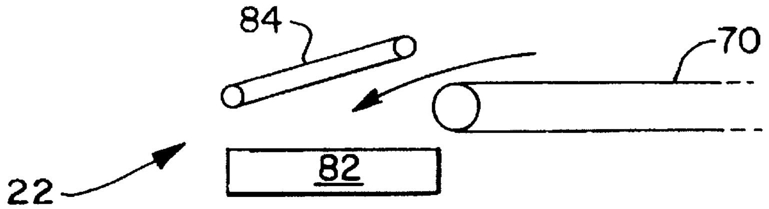
FIGS. 6A and 6B are respectively a schematic side-elevation view and a top plan view of an output module for use with the transport system of FIG. 1.
Figure 6B:
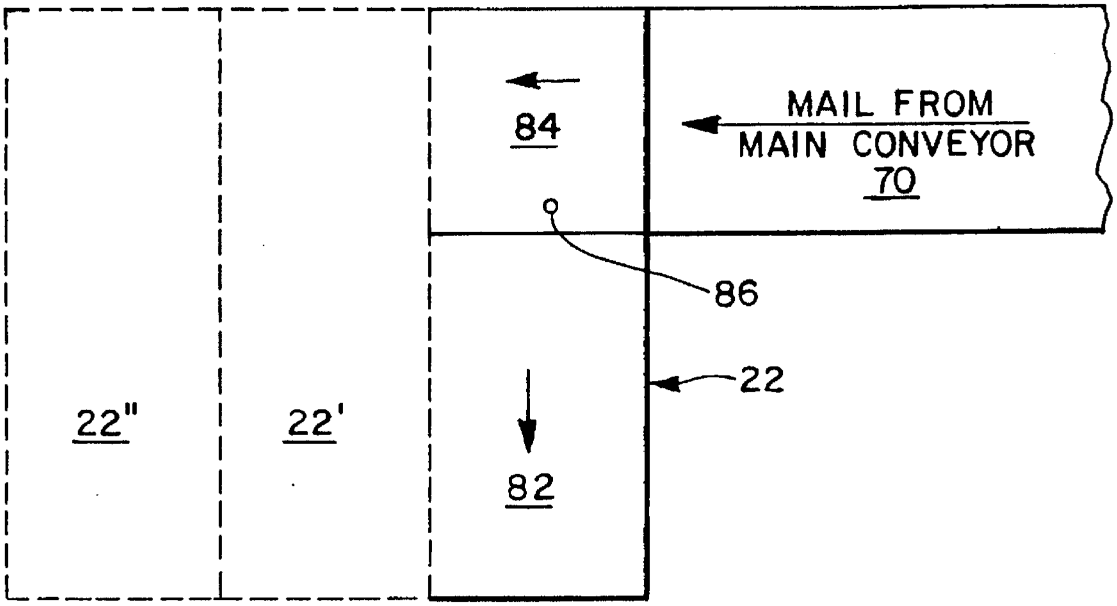

As indicated by the broken line showings in FIG. 6, a transport for a mail processing system in accordance with the present invention may include one or a plurality of output modules 22. These output modules each comprise an output conveyor 82. The output conveyors are arranged to transport mail pieces received from the main conveyor 20 in a direction which is generally transverse to the direction of movement on the main conveyor. The output conveyors are essentially horizontal conveyors which accumulate the bar coded mail. Each output conveyor 82 is provided, at its upstream end with a diverter section 84 which can be actuated on command from system control. As may be seen from FIG. 6A, the diverters are simply short conveyors which function as extensions of the main conveyor 20 when in operation. These short conveyors are mounted such that they can be rotated upwardly. When in the upward position shown in FIG. 6A, incoming mail pieces pass under the diverter 84 and fall onto an output conveyor 82. The thus diverted mail pieces will cover a sensor 86 thereby causing the sensor to generate an output signal which, after processing, causes the generation of a command for causing the output conveyor to be energized. Sensor 86 is positioned in the interest of providing a shingled output. As the shingled mail approaches the downstream end of an output conveyor 82 it encounters an angled stacking guide, not shown, which causes the shingled stack to stand more vertically. This allows a large quantity of mail to accumulate on an output module 22.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A document transport system comprising:

loading means, said loading means comprising an intermittently operated input conveyor means, said input conveyor means defining a substantially horizontal transport path for unsorted documents deposited thereon;

second conveyor means located downstream of said input conveyor means whereby said second conveyor means receives documents travelling on said input conveyor means, said second conveyor means arranging documents received thereon in overlapping fashion;

third conveyor means located adjacent to and downstream of said second conveyor means, said third conveyor means receiving and accumulating documents from said second conveyor means whereby a shallow stack of documents will be formed on said third conveyor means having a discharge end and moving said shallow stack of documents toward said discharge end;

means located immediately downstream of said discharge end of said third conveyor means for extracting single documents from said shallow stack of documents;

means for transporting single documents extracted from said shallow stack along a transport path, said transport path having input and discharge ends; and means located at the discharge end of said transport path for receiving and storing the documents.

2. The document transport system of claim 1 wherein said second conveyor means includes an inclined conveyor, the inclination of said conveyor causing documents to be received from said input conveyor means to overlap.

3. The document transport system of claim 1 wherein said third conveyor means includes an angled conveyor and a guide rail located at the lowest side of said angled conveyor whereby documents delivered to said angled conveyor from said second conveyor means will be edge registered against said guide rail and the thus formed shallow stack of edged registered documents will be continuously replenished by documents delivered to said angled conveyor.

4. The document transport system of claim 1 wherein said means for delivering extracted single documents to said main transport path comprises means for ensuring alignment of the documents with the transport path.

5. The document transport system of claim 1 wherein said means for extracting single documents comprises a feed roller cooperating with a retard roller, wherein the feed roller is driven in a direction to advance documents, and the retard roller is driven in an opposite direction by a motor through an eddy current clutch to separate documents.

6. A document transport system comprising:

loading means, said loading means comprising an intermittently operated input conveyor means, said input conveyor means defining a substantially horizontal transport path for unsorted documents deposited thereon;

prefeed means, said prefeed means located downstream of said input conveyor means, for receiving documents traveling on said input conveyor means, and said prefeed means comprising an intermittently driven angled conveyor means for lifting documents from said loading means;

feedstack means located adjacent to and downstream of said prefeed means for the accumulation of a shallow stack of documents whereby the shallow stack of documents will be formed on said feed stack means and moved toward a discharge end;

single document feed means for extracting single documents from said feed stack means;

main conveyor means for receiving documents from said single document feed means and transporting documents from an input end to a discharge end, said main conveyor means further comprising a reader means for reading information from documents; and output means for receiving documents from said main conveyor means and ordering documents into at least one group.

7. The document transport system of claim 6 wherein the single document feed means comprises a feed roller cooperating with a retard roller wherein the feed roller is driven in a direction to advance documents and the retard roller is driven in an opposite direction by a motor through an eddy current clutch to separate documents.

8. The document transport system of claim 6 wherein the main conveyor means further comprises a printing means for receiving instructions from said camera to print information on documents related to information read by said camera.

9. The document transport system of claim 6 further comprising an edge register means for edge registering documents from said single document feed means and transporting documents to said main conveyor means.

10. The document transport system of claim 6 wherein the output means comprises a plurality of diverter conveyors divertable to change a document path length; and output conveyor means for receiving documents from diverter means and accumulating documents received.

11. A document transport system comprising:

loading means for defining a substantially horizontal transport path for unsorted documents comprising an intermittently driven input conveyor;

prefeed means for receiving documents travelling on said loading means comprising an intermittently driven angled conveyor means for lifting documents from said loading means, said prefeed means located downstream from said loading means;

first sensor means for sensing documents and controlling the input conveyor of the loading means in response to the position of documents;

feed stack means located adjacent to and downstream from said prefeeding means for the accumulation of a shallow stack of documents whereby a shallow stack of documents is formed on said feed stack means and moved toward a discharge end;

second sensor means for sensing documents and controlling the angled conveyor of the prefeed means in response to the position of documents;

single document feed means for extracting single documents from said feed stack means, said single document feed means comprising intermittently driven rollers;

main conveyor means for receiving documents from said feed stack means and transporting documents from an input end to a discharge end;

third sensor means for sensing documents and controlling a roller of the single document feed means in response to the position of documents; and output means for receiving documents from said main conveyor means and accumulating said documents in at least one group.

12. The document transport system of claim 11 wherein the third sensing means comprises a camera that reads the documents on the main conveyor means.

13. The document transport system of claim 12 wherein the main conveyor further comprises a printing means for receiving instructions from said camera to print information on documents related to information read by said camera.

14. The document transport system of claim 11 further comprising between said single document feed means and said main conveyor means an edge register means for edge registering documents.

15. The document transport system of claim 11 wherein the single document feed means comprises a feed roller cooperating with a retard roller wherein, the feed roller is driven in a direction to advance documents and the retard roller is driven in an opposite direction by a motor through an eddy current clutch to separate documents.

16. The document transport system of claim 11 wherein said feed stack means includes an angled conveyor and a guide rail located at the lowest side of the angled conveyor whereby documents delivered to said angled conveyor from said prefeed means will be edge registered against a guide rail to form a shallow stack of edge registered documents.

17. The document transport system of claim 16 wherein the second sensor senses documents between the lowest side of the angled conveyor and the guide rail.

18. The document transport system of claim 11 wherein the first sensor means is positioned between the input conveyor of said loading means and the angled conveyor of said prefeed means.

19. The document transport system of claim 11 wherein the output means comprises a plurality of diverter conveyors divertable to change a document path length; and output conveyor means for receiving documents from diverter means and accumulating documents received.

* * * * *